US012417863B2

United States Patent
Långström et al.

(10) Patent No.: US 12,417,863 B2
(45) Date of Patent: Sep. 16, 2025

(54) POWER CABLE WITH MULTIPLE WATER BARRIERS

(71) Applicant: NKT HV Cables AB, Lyckeby (SE)

(72) Inventors: Sonny Långström, Karlskrona (SE);
Tommy Johansson, Bräkne-Hoby (SE);
Johan Jäderberg, Lyckeby (SE);
Håkan Sandell, Karlskrona (SE);
Christoffer Dahl Ryde, Lyckeby (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 18/172,211

(22) Filed: Feb. 21, 2023

(65) Prior Publication Data

US 2023/0268097 A1 Aug. 24, 2023

(30) Foreign Application Priority Data

Feb. 18, 2022 (EP) .................................. 22157502

(51) Int. Cl.
| | | |
|---|---|---|
| *H01B 9/00* | (2006.01) | |
| *H01B 3/30* | (2006.01) | |
| *H01B 7/14* | (2006.01) | |
| *H01B 7/282* | (2006.01) | |
| *H01B 13/14* | (2006.01) | |

(52) U.S. Cl.
CPC ............. *H01B 7/282* (2013.01); *H01B 3/30* (2013.01); *H01B 7/14* (2013.01); *H01B 9/00* (2013.01); *H01B 13/14* (2013.01)

(58) Field of Classification Search
CPC ..................................................... H01B 9/027
USPC ................................................... 174/120 SC
See application file for complete search history.

(56) References Cited

U.S. PATENT DOCUMENTS

| | | | |
|---|---|---|---|
| 2,041,842 A | 5/1936 | Layton | |
| 3,340,353 A | 9/1967 | Mildner | |
| 4,360,704 A * | 11/1982 | Madry | ..................... H01B 9/02 174/23 R |

(Continued)

FOREIGN PATENT DOCUMENTS

| | | |
|---|---|---|
| CN | 108922670 A | 11/2018 |
| DE | 363714 C | 11/1922 |

(Continued)

OTHER PUBLICATIONS

Extended European Search Report; Application No. 22157502.0; Completed Jul. 19, 2022; Mailing Date: Jul. 27, 2022; 8 Pages.

(Continued)

*Primary Examiner* — Chau N Nguyen
(74) *Attorney, Agent, or Firm* — Whitmyer IP Group LLC

(57) ABSTRACT

A power cable comprising: a power core including: a conductor, an insulation system including an inner semiconducting layer arranged around the conductor, an insulation layer arranged around the inner semiconducting layer, and an outer semiconducting layer arranged around the insulation layer, a first metallic water blocking layer arranged concentrically with and around the outer semiconducting layer, a semiconducting polymer layer arranged concentrically with and around the first metallic water blocking layer, and a second metallic water blocking layer arranged concentrically with and around the semiconducting polymer layer; and an outer sheath arranged around the second metallic water blocking layer.

20 Claims, 1 Drawing Sheet

(56) References Cited

U.S. PATENT DOCUMENTS

| | | | | |
|---|---|---|---|---|
| 4,703,134 A | * | 10/1987 | Uematsu | H01B 7/285 |
| | | | | 174/106 SC |
| 2005/0069666 A1 | * | 3/2005 | Ferrand | H02G 3/0481 |
| | | | | 428/347 |
| 2010/0186988 A1 | * | 7/2010 | Jeroense | H01B 7/045 |
| | | | | 174/103 |
| 2011/0048765 A1 | * | 3/2011 | Eggertsen | H01B 7/14 |
| | | | | 156/244.11 |
| 2012/0285725 A1 | * | 11/2012 | Maritano | H01B 3/52 |
| | | | | 174/120 FP |
| 2020/0126687 A1 | * | 4/2020 | Bareggi | H01B 7/0225 |
| 2021/0313092 A1 | * | 10/2021 | Grabinsky | H01B 13/262 |
| 2022/0189659 A1 | * | 6/2022 | Mauri | H01B 7/2825 |

FOREIGN PATENT DOCUMENTS

| | | |
|---|---|---|
| EP | 2312591 A1 | 4/2011 |
| EP | 3438993 A1 | 2/2019 |
| EP | 3786982 A1 | 3/2021 |
| FR | 757489 A | 12/1933 |
| KR | 101142449 B1 | 4/2012 |
| WO | 9818186 A1 | 4/1998 |
| WO | 2020013860 A1 | 1/2020 |
| WO | 2021123373 A1 | 6/2021 |
| WO | 2021248091 A1 | 12/2021 |

OTHER PUBLICATIONS

European Office Action; Application No. 22157502.0; Conpleted Jul. 11, 2025; 10 Pages.

\* cited by examiner

POWER CABLE WITH MULTIPLE WATER BARRIERS

TECHNICAL FIELD

The present disclosure generally relates to power cables.

BACKGROUND

Power cables comprise electric insulation to electrically insulate the conductor. A radial water barrier is generally required to prevent moisture from penetrating into the insulation.

A continuous metal layer that is extruded around the conductor and the insulating layers is a common type of moisture penetration barrier. Conventionally, the metal used is lead.

A lead moisture shield provides a safe barrier against water penetration but is associated with several disadvantages. For example, a lead moisture shield for use with high voltage cables requires a considerable wall thickness. This results in a very heavy cable. Furthermore, lead is a toxic material that is hazardous both for humans and for the environment.

It is known to provide power cables with a layer of aluminium laminate for moisture protection. The metal laminate is bonded with an adhesive along a longitudinal seam. However, this seam is a weak point through which moisture may be able to migrate.

It is also known to provide power cables with water barrier in the form of a metal sheath that is joined by welding the longitudinal seam, as for example disclosed in EP 2 312 591, EP3 438 993, and EP 3 786 982. When performing long weld seams the risk of through-breaking weld defects increases, which may result in water intrusion into the power cable.

SUMMARY

A general object of the present disclosure is to provide a power cable that solves or at least mitigates the problems of the prior art.

There is hence provided a power cable comprising: a power core including: a conductor, an insulation system comprising an inner semiconducting layer arranged around the conductor, an insulation layer arranged around the inner semiconducting layer, and an outer semiconducting layer arranged around the insulation layer, a first metallic water blocking layer arranged concentrically with and around the outer semiconducting layer, a semiconducting polymer layer arranged concentrically with and around the first metallic water blocking layer, and a second metallic water blocking layer arranged concentrically with and around the semiconducting polymer layer; and an outer sheath arranged around the second metallic water blocking layer.

By providing more than one water blocking layer, the water resistance of the power cable is improved compared to using a laminated and bonded water barrier or a single welded water barrier. If one of the water blocking layers would lack fusion/bonding in one region, the other one would likely protect from water ingression in this region.

The power cable may be a medium voltage power cable or a high voltage power cable. With medium voltage is herein meant a voltage in the range of 1 KV-72.5 kV. With high voltage is herein meant a voltage above 72.5 kV.

The power cable may be a direct current (DC) power cable or an alternating current (AC) power cable. The AC power cable may be a single phase or multi-phase AC power cable.

The power cable may comprise more than two metallic water blocking layers. The power cable may for example comprise a third metallic water blocking layer. The power cable may comprise a second semiconducting polymer layer arranged concentrically with and around the second metallic water blocking layer, and the third metallic water blocking layer may be arranged concentrically with and around the second semiconducting polymer layer. The second semiconducting polymer layer may be bonded to the second metallic water blocking layer and to the third metallic water blocking layer. The bonding may for example be by means of adhesive.

The power cable may according to some examples have more than three metallic water blocking layers.

In general, the number of metallic water blocking layers of the power cable depends on the number of years the power cable is expected to be operated.

According to one embodiment the semiconducting polymer layer is an extruded layer.

The semiconducting polymer layer may be extruded onto the first metallic water blocking layer.

According to one embodiment the first metallic water blocking layer is or comprises a first metal foil.

According to one embodiment the second metallic water blocking layer is or comprises a second metal foil.

According to one embodiment the first metallic water blocking layer has a first seam extending axially along the power core, the first seam being formed by bonding of overlapping edges of the first metallic water blocking layer by means of adhesive or solder.

Making a weld seam requires that the water barrier is arranged at a radial distance from the interior components, such as the insulation system, of the power cable so as not to damage these components by heat during the welding. The water barrier is after the welding subjected to a diameter reduction process using rollers. By bonding the overlapping edges of first metallic water blocking layer using an adhesive or solder, heat developed in the bonding process will be substantially lower than when welding. The bonding can therefore be done close to the underlying layer compared to when welding. No diameter reduction of the first metallic water blocking layer may thus be required.

The adhesive or solder may for example be melted by the semiconducting polymer layer when it is extruded onto the first metallic water blocking layer.

The solder may be a lead-free tin solder.

The lead-free tin solder may be a tin alloy comprising at least one of silver, copper, antimony, bismuth, zink and nickel.

The first metallic water blocking layer may have a radial thickness of at most 0.5 mm, for example at most 0.4 mm, such as at most, 0.3 mm, for example at most 0.2 mm, if the overlapping edges are bonded by adhesive or solder.

The first metallic water blocking layer may have a radial thickness of at least 0.1 mm if the overlapping edges are bonded by adhesive or solder.

The second metallic water blocking layer may have a radial thickness of at most 0.5 mm, for example at most 0.4 mm, such as at most, 0.3 mm, for example at most 0.2 mm, if the overlapping edges are bonded by adhesive or solder.

The second metallic water blocking layer may have a radial thickness of at least 0.1 mm if the overlapping edges are bonded by adhesive or solder.

Alternatively, the edges of the first metallic water blocking layer may be welded. In this case, the edges are typically not overlapping. The first metallic water blocking layer may if welded have a radial thickness in the range 0.3-5 mm. The second metallic water blocking layer may if welded have a radial thickness in the range 0.3-5 mm, for example 0.5 mm-5 mm, such as 0.6-5 mm, for example 0.6 mm-3 mm, such as 0.6 mm to 2 mm.

If the first metallic water blocking layer is welded it is non-laminated and consists of metal.

If the second metallic water blocking layer is welded it is non-laminated and consists of metal.

According to one embodiment the second metallic water blocking layer has a second seam extending axially along the power core, the second seam being formed by bonding of overlapping edges of the second metallic water blocking layer by means of adhesive or solder.

The solder may be a lead-free tin solder.

The lead-free tin solder may be a tin alloy comprising at least one of silver, copper, antimony, bismuth, zink and nickel.

Alternatively, the edges of the second metallic water blocking layer may be welded.

According to one embodiment the first seam and the second seam are arranged between 90 and 270 degrees offset from each other in the circumferential direction of the power core.

The risk of water intrusion into the insulation system is thus reduced because even if moisture migrates through the first seam it would not easily be able to penetrate the second seam directly as it is arranged circumferentially offset from the first seam.

According to one embodiment the first seam and the second seam are arranged between 120 and 240 degrees offset from each other in the circumferential direction of the power core.

According to one embodiment the first seam and the second seam are arranged between 160 and 200 degrees offset from each other in the circumferential direction of the power core.

The first seam and the second seam may for example be arranged diametrically opposite to each other.

According to one embodiment the semiconducting polymer layer adheres to the first metallic water blocking layer.

The semiconducting polymer layer may be arranged in direct contact with the first metallic water blocking layer. Alternatively, the semiconducting polymer layer may be bonded to the first metallic water blocking layer by means of a semiconducting adhesive.

According to one embodiment the semiconducting polymer layer adheres to the second metallic water blocking layer.

The semiconducting polymer layer may be arranged in direct contact with the second metallic water blocking layer. Alternatively, the semiconducting polymer layer may be bonded to the second metallic water blocking layer by means of a semiconducting adhesive.

According to one embodiment the first metallic water blocking layer comprises aluminium, copper, or stainless steel.

The first metallic water blocking layer may consist of aluminium, an aluminium alloy, copper, a copper alloy, or stainless steel such as austenitic stainless steel.

According to one embodiment the second metallic water blocking layer comprises aluminium, copper, or stainless steel.

The second metallic water blocking layer may consist of aluminium, an aluminium alloy, copper, a copper alloy, or stainless steel such as austenitic stainless steel.

According to one embodiment the power core is a first power core, and the power cable comprises a second power core and a third power core, each of the second power core and the third power core comprising: a conductor, an insulation system comprising an inner semiconducting layer arranged around the conductor, an insulation layer arranged around the inner semiconducting layer, and an outer semiconducting layer arranged around the insulation layer, a first metallic water blocking layer arranged concentrically with and around the outer semiconducting layer, a semiconducting polymer layer arranged concentrically with and around the first metallic water blocking layer, and a second metallic water blocking layer arranged concentrically with and around the semiconducting polymer layer, wherein the outer sheath is arranged around the first power core, the second power core, and the third power core.

According to one embodiment the power cable is a submarine power cable.

The power cable may alternatively be an underground power cable.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
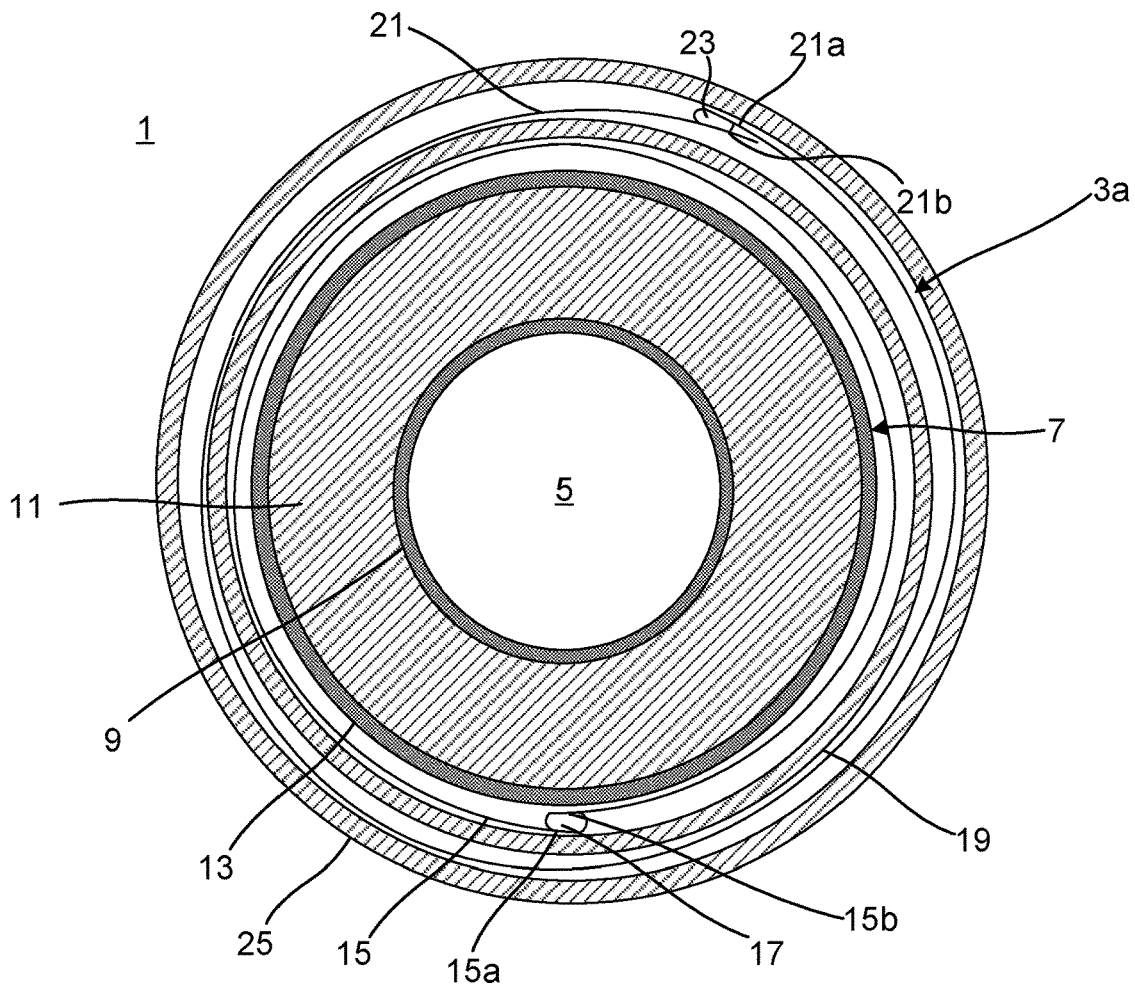
FIG. 1 schematically shows a cross section of an example of a power cable.

FIG. 1 schematically shows a cross section of an example of a power cable 1.

The power cable 1 comprises a power core 3a.

The power core 3a comprises a conductor 5. The conductor 5 may for example be solid, stranded, or of Milliken type. The conductor 5 is made of metal. The conductor 5 may for example comprise copper or aluminium.

The power core 3a comprises an insulation system 7.

The insulation system 7 comprises an inner semiconducting layer 9 arranged around the conductor 5. The inner semiconducting layer 9 may for example comprise cross-linked polyethylene (XLPE), polypropylene (PP), ethylene propylene diene monomer (EPDM) rubber, or ethylene propylene rubber (EPR), mixed with a semiconductive component such as carbon black to form a semiconducting polymer, or a semiconducting paper. The semiconducting polymer may be extruded.

The insulation system 7 comprises an insulation layer 11. The insulation layer 11 is arranged around the inner semiconducting layer 9. The insulation layer 11 may be in direct contact with the inner semiconducting layer 9. The insulation layer 11 may for example comprise XLPE, PP, EPDM rubber, or EPR, or paper. The insulation layer 11 may be extruded.

The insulation system 7 comprises an outer semiconducting layer 13 arranged around the insulation layer 11. The outer semiconducting layer 13 may be in direct contact with the insulation layer 11. The outer semiconducting layer 13 may for example comprise XLPE, PP, EPDM rubber, or EPR, mixed with a semiconductive component such as carbon black to form a semiconducting polymer, or a semiconducting paper. The semiconducting polymer may be extruded.

The insulation system 7 may be a triple extruded insulation system.

The power core 3a comprises a first metallic water blocking layer 15. The first metallic water blocking layer 15 is arranged concentrically with and around the outer semiconducting layer 13.

The power core 3 may comprise a bedding layer (not shown) arranged between the outer semiconducting layer 13 and the first metallic water blocking layer 15. The bedding layer may for example be formed by winding tape around the outer semiconducting layer 13 or it may be applied by folding it longitudinally around the insulation system 7. The bedding layer may be semiconducting. The bedding layer may be hygroscopic.

The first metallic water blocking layer 15 may comprise or consist of a first metal sheath or first metal foil. The metal may for example be aluminium, an aluminium alloy, copper, a copper alloy, or stainless steel.

The first metallic water blocking layer 15 may have a laminated structure. The first metallic water blocking layer 15 may for example comprise a substrate layer and the first metal sheath or first metal foil may be arranged on the substrate layer. The substrate layer may comprise a polymeric material.

The first metallic water blocking layer 15 is during manufacturing wrapped around the outer semiconducting layer 13 with overlapping edges 15a and 15b which are bonded to each other to form a first seam 17 extending along the longitudinal axis of the power core 3a. The bonding may for example be made by means of an adhesive or by solder. The adhesive may for example be a hot melt adhesive. The adhesive or solder may be arranged as a string along the entire length of the first metallic water blocking layer 15.

The power core 3a comprises a semiconducting polymer layer 19 arranged concentrically with and around the first metallic water blocking layer 15. The semiconducting polymer layer 19 may for example comprise XLPE, PP, EPDM or EPR.

The semiconducting polymer layer 19 may be a polymer jacket.

The semiconducting polymer layer 19 may be in direct contact with the outer surface of the first metallic water blocking layer 15.

The semiconducting polymer layer 19 may be extruded onto the first metallic water blocking layer 15. The heat generated by the extrusion process may melt the adhesive or solder arranged between the overlapping edges 15a and 15b causing the overlapping edges 15a and 15b to bond and the first seam 17 to be formed.

Alternatively, the bonding of the overlapping edges 15a and 15b may be made before the semiconducting polymer layer 19 is applied onto the first metallic water blocking layer 15.

The power core 3a comprises a second metallic water blocking layer 21. The second metallic water blocking layer 21 is arranged concentrically with and around the semiconducting polymer layer 19.

The second metallic water blocking layer 21 may comprise or consist of a second metal sheath or a second metal foil. The metal may for example be aluminium, an aluminium alloy, copper, a copper alloy, or stainless steel.

The second metallic water blocking layer 21 may have a laminated structure. The second metallic water blocking layer 21 may for example comprise a substrate layer and the second metal sheath or second metal foil may be arranged on the substrate layer. The substrate layer may comprise a polymeric material.

The second metallic water blocking layer 21 is during manufacturing wrapped around the semiconducting polymer layer 19 with overlapping edges 21a and 21b which are bonded to each other to form a second seam 23 extending along the longitudinal axis of the power core 3a. The bonding may for example be made by means of an adhesive or by solder. The adhesive may for example be a hot melt adhesive. The adhesive or solder may be arranged as a string along the entire length of the second metallic water blocking layer 21.

The second metallic water blocking layer 21 may adhere to the semiconducting polymer layer 19. The power core 3a may for example comprise an adhesive layer arranged between the semiconducting polymer layer 19 and the second metallic water blocking layer 21 bonding the second metallic water blocking layer 21 to the semiconducting polymer layer 19. The adhesive layer may be semiconductive.

The first seam 17 and the second seam 23 may be circumferentially offset from each other in the circumferential direction of the power core 3a. The first seam 17 and the second seam 23 may for example be arranged between 90 and 270 degrees offset from each other in the circumferential direction of the power core 3a, such as between 120 and 240 degrees offset from each other in the circumferential direction of the power core 3a, such as between 160 and 200 degrees offset from each other in the circumferential direction of the power core 3a, such as between 170 and 190 degrees offset from each other in the circumferential direction of the power core 3a, such as between 175 and 185 degrees offset from each other in the circumferential direction of the power core 3a. The first seam 17 and the second seam 23 may be arranged diametrically opposite to each other according to one example.

The power core 3a may comprises an outer power core jacket (not shown) arranged concentrically with and around the second metallic water blocking layer 21. The outer power core jacket may be a polymer layer for example comprising XLPE, PP, EPDM or EPR.

The outer power core jacket may be in direct contact with the outer surface of the second metallic water blocking layer 21.

The outer power core jacket may be extruded onto the second metallic water blocking layer 21. The heat generated by the extrusion process may melt the adhesive or solder arranged between the overlapping edges 21a and 21b causing the overlapping edges 21a and 21b to bond and the second seam 23 to be formed.

The second metallic water blocking layer 21 may adhere to the outer power core jacket. The power core 3a may for example comprise an adhesive layer arranged between the outer power core jacket and the second metallic water blocking layer 21 bonding the second metallic water blocking layer 21 to the outer power core jacket. The adhesive layer may be semiconductive.

The power cable 1 comprises an outer sheath 25 arranged around the second metallic water blocking layer 21.

The outer sheath 25 may be arranged around the outer power core jacket.

The outer sheath 25 may be the outermost layer of the power cable 1. The outer sheath 25 may for example be a polymeric jacket or it may comprise polymeric yarn wound helically around the second metallic water blocking layer 21 and/or the outer power core jacket.

Figure 2:
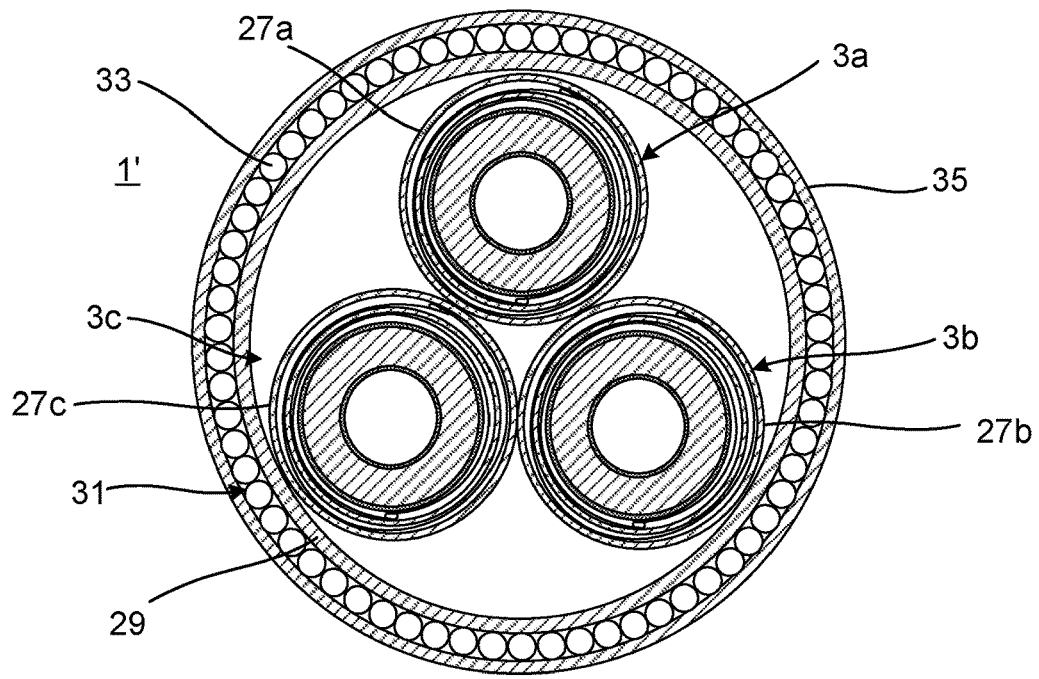
FIG. 2 schematically shows a cross section of another example of a power cable.

FIG. 2 shows another example of a power cable 1'. The power cable 1' has three power cores, namely a first power core 3a, a second power core 3b and a third power core 3c. Each power core 3b-3c is of the same type as the power core 3a described above.

Each power core 3a comprises an outer power core jacket 27a, 27b, 27c arranged around the respective second metallic water blocking layer. The power core jacket 27a, 27b, 27c may comprise a polymer material such as XLPE, PP, EDPM or EPR. The outer power core jackets 27a, 27b, 27c may be extruded.

The power cores 3a-3c are stranded. The exemplified power cable 1' comprises an armour bedding 29 which encloses the stranded power cores 3a-3c.

The power cable 1' comprises an armour layer 31 arranged radially outside the armour bedding 29. The armour layer 31 comprises a plurality of armour wires 33 laid helically around the armour bedding 29. The armour wires 33 may for example be made of galvanized carbon steel, austenitic stainless steel, or a synthetic material.

The armour wires 33 may be immersed in bitumen.

The power cable 1' comprises an outer sheath 35 arranged around the armour layer 31. The outer sheath 35 may be the outermost layer of the power cable 1'. The outer sheath 35 may for example be a polymeric jacket or it may comprise polymeric yarn wound helically around the armour layer 31.

The power core 3a may according to some examples comprise a screen arranged radially outside the insulation system 7. The screen may for example comprise copper. The screen may for example comprise copper wires. It may be beneficial to provide the screen if the first metallic water blocking layer 15 and the second metallic water blocking layer 21 are bonded by adhesive or solder, because in this case they may be too thin to be able to handle short circuit currents.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:
1. A power cable comprising:
a power core including:
a conductor,
an insulation system comprising an inner semiconducting layer arranged around the conductor, an insulation layer arranged around the inner semiconducting layer, and an outer semiconducting layer arranged around the insulation layer,
a first metallic water blocking layer arranged concentrically with and around the outer semiconducting layer, the first metallic water blocking layer having a radial thickness of at most 0.5 mm,
a semiconducting polymer layer arranged concentrically with and around the first metallic water blocking layer, and
a second metallic water blocking layer arranged concentrically with and around the semiconducting polymer layer; and
an outer sheath arranged around the second metallic water blocking layer;
wherein the first metallic water blocking layer has a first seam extending axially along the power core, the first seam being formed by bonding of overlapping edges of the first metallic water blocking layer;
wherein the second metallic water blocking layer has a second seam extending axially along the power core, the second seam being formed by bonding of overlapping edges of the second metallic water blocking layer;
wherein the bonding of the overlapping edges of one of the first metallic water blocking layer or the second metallic water blocking layer is by an adhesive which is arranged as a string along an entire length of the one of the first metallic water blocking layer or the second metallic water blocking layer, and wherein the bonding of the overlapping edges of the other one of the first metallic water blocking layer or the second metallic water blocking layer is by a solder which is arranged as a string along an entire length of the other one of the first metallic water blocking layer or the second metallic water blocking layer;
wherein the first seam and the second seam are arranged between 90 and 270 degrees offset from each other in the circumferential direction of the power core.

2. The power cable as claimed in claim 1, wherein the semiconducting polymer layer is an extruded layer.

3. The power cable as claimed in claim 2, wherein the first metallic water blocking layer is or includes a first metal foil.

4. The power cable as claimed in claim 2, wherein the second metallic water blocking layer is or includes a second metal foil.

5. The power cable as claimed in claim 1, wherein the first metallic water blocking layer is or includes a first metal foil.

6. The power cable as claimed in claim 1, wherein the second metallic water blocking layer is or includes a second metal foil.

7. The power cable as claimed in claim 1, wherein the first seam and the second seam are arranged between 120 and 240 degrees offset from each other in the circumferential direction of the power core.

8. The power cable as claimed in claim 1, wherein the first seam and the second seam are arranged between 160 and 200 degrees offset from each other in the circumferential direction of the power core.

9. The power cable as claimed in claim 1, wherein the semiconducting polymer layer adheres to the first metallic water blocking layer.

10. The power cable as claimed in claim 1, wherein the semiconducting polymer layer adheres to the second metallic water blocking layer.

11. The power cable as claimed in claim 1, wherein the first metallic water blocking layer includes aluminium, copper, or stainless steel.

12. The power cable as claimed in claim 1, wherein the second metallic water blocking layer includes aluminium, copper, or stainless steel.

13. The power cable as claimed in claim 1, wherein the power core is a first power core, and the power cable includes a second power core and a third power core, each of the second power core and the third power core comprising:
- a conductor,
- an insulation system comprising an inner semiconducting layer arranged around the conductor, an insulation layer arranged around the inner semiconducting layer, and an outer semiconducting layer arranged around the insulation layer,
- a first metallic water blocking layer arranged concentrically with and around the outer semiconducting layer,
- a semiconducting polymer layer arranged concentrically with and around the first metallic water blocking layer, and
- a second metallic water blocking layer arranged concentrically with and around the semiconducting polymer layer,
- wherein the outer sheath is arranged around the first power core, the second power core, and the third power core.

14. The power cable as claimed in claim 1, wherein the power cable is a submarine power cable.

15. The power cable as claimed in claim 1, wherein the first metallic water blocking layer has a laminated structure.

16. The power cable as claimed in claim 15, wherein the laminated structure of the first metallic water blocking layer comprises a substrate layer and a first metal foil arranged on the substrate layer.

17. The power cable as claimed in claim 16, wherein the substrate layer comprises a polymeric material.

18. The power cable as claimed in claim 1, further comprising an adhesive layer arranged between the semiconducting polymer layer and the second metallic water blocking layer, thereby bonding the second metallic water blocking layer to the semiconducting polymer layer.

19. The power cable as claimed in claim 1, wherein the semiconducting polymer layer is disposed on the first metallic water blocking layer as an extrusion which melts the adhesive or solder.

20. The power cable as claimed in claim 1, wherein the second metallic water blocking layer has a radial thickness of at most 0.5 mm.

* * * * *